US010950905B2

(12) United States Patent
Choi et al.

(10) Patent No.: US 10,950,905 B2
(45) Date of Patent: Mar. 16, 2021

(54) BATTERY MODULE, AND BATTERY PACK AND VEHICLE COMPRISING THE SAME

(71) Applicant: LG Chem, Ltd., Seoul (KR)

(72) Inventors: Mi-Geum Choi, Daejeon (KR); Dal-Mo Kang, Daejeon (KR); Jeong-O Mun, Daejeon (KR); Yoon-Koo Lee, Daejeon (KR)

(73) Assignee: LG Chem, Ltd., Seoul (KR)

( * ) Notice: Subject to any disclaimer, the term of this patent is extended or adjusted under 35 U.S.C. 154(b) by 24 days.

(21) Appl. No.: 15/765,664

(22) PCT Filed: Dec. 20, 2016

(86) PCT No.: PCT/KR2016/014956
§ 371 (c)(1),
(2) Date: Apr. 3, 2018

(87) PCT Pub. No.: WO2017/209365
PCT Pub. Date: Dec. 7, 2017

(65) Prior Publication Data
US 2018/0294535 A1    Oct. 11, 2018

(30) Foreign Application Priority Data

May 31, 2016  (KR) .................. 10-2016-0067469

(51) Int. Cl.
*H01M 10/62* (2014.01)
*H01M 10/65* (2014.01)
(Continued)

(52) U.S. Cl.
CPC ........... *H01M 10/625* (2015.04); *H01M 2/02* (2013.01); *H01M 2/1077* (2013.01); *H01M 2/26* (2013.01);
(Continued)

(58) Field of Classification Search
CPC .................... H01M 10/625; H01M 10/653
See application file for complete search history.

(56) References Cited

U.S. PATENT DOCUMENTS 4,738,906 A * 4/1988 Sanders .............. H01M 10/625
                                                    180/68.5
9,065,152 B2   6/2015 Ryu et al.
(Continued)

FOREIGN PATENT DOCUMENTS

CN    101855746 A    10/2010
CN    102738536 A    10/2012
(Continued)

OTHER PUBLICATIONS

Search Report and Written Opinion dated Apr. 3, 2017, for Application No. PCT/KR2016/014956 (w/English translation of Search Report).
(Continued)

*Primary Examiner* — Maria Laios
*Assistant Examiner* — Angela J Martin
(74) *Attorney, Agent, or Firm* — Morgan, Lewis & Bockius LLP (57) ABSTRACT

Disclosed is a battery module, as well as a battery pack and a vehicle comprising the same. The battery module includes a plurality of battery cells arranged side by side to face each other in at least one direction, a cooling plate located below the plurality of battery cells, and a heat transfer tape adhered to the battery cells to transfer heat of the battery cells to the cooling plate.

14 Claims, 10 Drawing Sheets

(51) Int. Cl.
  *H01M 2/02* (2006.01)
  *H01M 2/10* (2006.01)
  *H01M 2/26* (2006.01)
  *H01M 4/64* (2006.01)
  *H01M 10/61* (2014.01)
  *H01M 10/64* (2014.01)
  *H01M 10/625* (2014.01)
  *H01M 10/6556* (2014.01)
  *H01M 10/6551* (2014.01)
  *H01M 10/6555* (2014.01)
  *H01M 10/653* (2014.01)
  *H01M 10/6554* (2014.01)
  *H01M 10/613* (2014.01)
  *H01M 10/647* (2014.01)
  *H01M 4/02* (2006.01)

(52) U.S. Cl.
  CPC ......... *H01M 4/64* (2013.01); *H01M 10/653* (2015.04); *H01M 10/6551* (2015.04); *H01M 10/6554* (2015.04); *H01M 10/6555* (2015.04); *H01M 10/6556* (2015.04); *H01M 10/613* (2015.04); *H01M 10/647* (2015.04); *H01M 2004/027* (2013.01); *H01M 2004/028* (2013.01); *H01M 2220/20* (2013.01); *Y02T 10/70* (2013.01)

(56) References Cited

U.S. PATENT DOCUMENTS

| | | | |
|---|---|---|---|
| 2011/0008665 A1 | 1/2011 | Yoon et al. | |
| 2011/0059347 A1* | 3/2011 | Lee | H01M 2/0277 429/120 |
| 2012/0258337 A1 | 10/2012 | Wang | |
| 2014/0099527 A1 | 4/2014 | Seong et al. | |
| 2014/0205875 A1 | 7/2014 | Schmidt | |
| 2015/0064540 A1 | 3/2015 | Roh et al. | |
| 2015/0147622 A1* | 5/2015 | Hwang | H01M 2/1077 429/120 |
| 2015/0180095 A1* | 6/2015 | Chen | H01M 10/4207 429/120 |
| 2015/0333304 A1* | 11/2015 | Sekine | H01M 10/6557 429/153 |

FOREIGN PATENT DOCUMENTS

| | | |
|---|---|---|
| CN | 104285315 A | 1/2015 |
| EP | 2 866 296 A1 | 4/2015 |
| EP | 3 358 668 A1 | 8/2018 |
| JP | 2009-252553 A | 10/2009 |
| JP | 2013-051099 A | 3/2013 |
| JP | 2013-247024 A | 12/2013 |
| JP | 2015-520922 A1 | 7/2015 |
| KR | 10-2005-0014426 A | 2/2005 |
| KR | 10-2005-0092605 A | 9/2005 |
| KR | 2008-0042965 A | 5/2008 |
| KR | 10-2015-0047373 A | 5/2015 |

OTHER PUBLICATIONS

Office Action dated Jun. 29, 2020, issued in corresponding Chinese Patent Application No. 201680061220.2.

* cited by examiner

BATTERY MODULE, AND BATTERY PACK AND VEHICLE COMPRISING THE SAME

TECHNICAL FIELD

The present disclosure relates to a battery module having a plurality of secondary batteries, and a battery pack and a vehicle comprising the same, and more particularly, to a battery module capable of cooling a battery cell, and a battery pack and a vehicle comprising the same.

The present application claims priority under 35 U.S.C. § 119 to Korean Patent Application No. 10-2016-0067469 filed on May 31, 2016 in the Republic of Korea, and under 35 U.S.C. § 365 to PCT/KR2016/014956 filed on Dec. 20, 2016, the disclosures of which are incorporated herein by reference.

BACKGROUND

Secondary batteries are highly applicable to a wide range of products and have electrical characteristics with high energy density. Such secondary batteries are applied not only to portable electronic devices but also to electric vehicles, hybrid vehicles, and electric power storage devices, driven by electric driving sources.

A battery pack applied to an electric vehicle and the like is configured so that a plurality of battery modules, each having a plurality of battery cells, are connected to obtain a high output. Each battery cell is an electrode assembly and may be repeatedly charged and discharged by an electrochemical reaction among components including a positive electrode current collector, a negative electrode current collector, a separator, an active material, an electrolyte and the like.

Meanwhile, along with an increased need for a large capacity structure and utilization as energy storage sources in recent years, there is a growing demand for a multi-module battery pack in which a plurality of battery modules, each having a plurality of secondary batteries connected in series or in parallel, are aggregated.

A battery pack of a multi-module structure is manufactured so that a plurality of secondary batteries are densely packed in a narrow space, and thus it is important to easily discharge the heat generated from each secondary battery. The secondary battery is charged or discharged by means of electrochemical reactions as described above. Thus, if the heat of the battery module generated during the charging and discharging process is not effectively removed, heat accumulation occurs. In addition, the deterioration of the battery module is promoted, and in occasions, ignition or explosion may occur.

Therefore, a high-output large-capacity battery module, or a battery pack having the same, requires a cooling device that cools battery cells included therein.

Generally, the cooling device is classified into two types of cooling device, namely an air cooling type and a water cooling type, but the air cooling type is more widely used than the water cooling type due to short circuit or waterproofing of the secondary battery.

Since one battery cell may not produce a large power, a commercially available battery module generally includes a plurality of battery cells as many as necessary so as to be stacked and packaged in a module case. In addition, in order to keep the temperature of the secondary battery at a proper level by cooling the heat generated while individual battery cells are producing electricity, a plurality of cooling pins corresponding to the area of the battery cells are inserted as a heat dissipating member throughout the battery cells. The cooling pins absorbing heat from each battery cell are connected to a single cooling plate to transfer the heat to the cooling plate. The cooling plate transfers the heat, received from the cooling pins, to a heat sink, and the heat sink is cooled by cooling water or cooling air.

Generally, when the battery cell and the cooling pins are coupled, a heat transfer material capable of minimizing the thermal resistance at the contact interface is applied to the interface to adhere the battery cell and the cooling pins. However, when the battery cell and the cooling pins are coupled using such a material, a material cost and a process cost increase due to the heat transfer material. In addition, it is difficult to uniformly apply the heat transfer material to the areas of the battery cell and the cooling pins, and the cooling performance may be deteriorated due to irregularity of the contact surface after drying. Moreover, when the battery cell swells, the cooling performance may be deteriorated due to the separation of the contact surface. Also, when the battery cell is used for a long time, the contact interface may be separated.

SUMMARY

The present disclosure is designed to solve the problems of the related art, and therefore the present disclosure is directed to providing a battery module which may improve the cooling efficiency of a battery cell, and a battery pack and a vehicle comprising the same.

Also, the present disclosure is also directed to providing a battery module which may cool a battery cell without providing a cooling pin between battery cells, and a battery pack and a vehicle comprising the same.

In addition, the present disclosure is also directed to providing a battery module which may protect a battery cell against an external impact, and a battery pack and a vehicle comprising the same.

The present disclosure is not limited thereto, and other objects not mentioned herein may be clearly understood by those skilled in the art from the following description.

The present disclosure provides a battery module having a plurality of battery cells.

According to an embodiment of the present disclosure, the battery module may comprise: a plurality of battery cells arranged side by side to face each other in at least one direction; a cooling plate located below the plurality of battery cells; and a heat transfer tape adhered to the battery cells to transfer heat of the battery cells to the cooling plate.

In an embodiment, the heat transfer tape may include: an adhesion portion having one surface and the other surface which are in surface contact with different battery cells, to adhere the battery cells; and a buffering portion located between an edge portion of the battery cell and the cooling plate.

In an embodiment, the buffering portion may have a buffering space formed therein.

In an embodiment, the cooling plate may be made of aluminum, and the heat transfer tape may be made of graphite.

In an embodiment, the buffering portion may include: a first inclined surface which is in contact with an edge portion of any one battery cell among the battery cells; a second inclined surface which is in contact with an edge portion of another battery cell adjacent to the any one battery cell, and having one end connected to the first inclined surface; and a horizontal surface which is in contact with the cooling plate, and having one end respectively connected to the first inclined surface and the second inclined surface, wherein the first inclined surface, the second inclined surface and the horizontal surface may be combined to form the buffering space therein.

In an embodiment, the cooling plate may include: a plurality of protrusions on which the first inclined surface and the second inclined surface are located, the plurality of protrusions being in contact with the horizontal surface and protruding in a direction perpendicular to an arrangement direction of the plurality of battery cells; and a plurality of accommodation portions located respectively between the neighboring protrusions to accommodate the edge portion of the battery cell.

In an embodiment, the protrusions may be shaped to incline upwards from both edges to a center thereof, and the adhesion portion may be provided above the protrusions.

In an embodiment, the buffering portion may have an adhesion surface on a surface which is in contact with the edge portion of the battery cell and the cooling plate.

In an embodiment, a surface of the buffering portion, which faces the buffering space, may be a non-adhesion surface.

In an embodiment, a surface of the buffering portion, which faces the buffering space, may have an adhesive force weaker than an adhesive force of the adhesion surface of the adhesion portion.

In an embodiment, the battery module may further comprise a heat sink in which a cooling fluid flows, the heat sink exchanging heat with the cooling plate.

In an embodiment, an area of the adhesion portion in contact with the surface of the battery cell may be smaller than an area of the battery cell.

The present disclosure may provide a battery pack, comprising the battery module described above.

The present disclosure may provide a vehicle, comprising the battery pack described above.

According to an embodiment of the present disclosure, the adhesion and cooling efficiency of the battery cells may be improved by attaching the battery cells by using a heat transfer tape with good thermal conductivity.

Also, according to an embodiment of the present disclosure, since a buffering portion is provided between the edge portion of the battery cell and the cooling plate, it is possible to protect the battery cell from an external impact.

In addition, according to an embodiment of the present disclosure, since a buffering portion is provided between the edge portion of the battery cell and the cooling plate, it is possible to protect the battery cell when the battery cell swells therein.

Also, according to an embodiment of the present disclosure, the weight of the battery module may be minimized by applying a heat transfer tape to the battery module.

In addition, according to an embodiment of the present disclosure, the battery module may be manufactured in a simple way by using the heat transfer tape, and the battery cells may be fixed to each other in a better way.

Also, according to an embodiment of the present disclosure, since a heat transfer tape capable of adhering the battery cells of the battery module and simultaneously protecting the battery cells from an external impact is provided, it is possible to reduce a material cost of the battery module and also simplify a manufacturing process of the battery module.

The effects of the present disclosure are not limited to the above, and effects not mentioned herein may be clearly understood by those skilled in the art from the specification and the accompanying drawings.

DETAILED DESCRIPTION

Hereinafter, embodiments of the present disclosure will be described in more detail with reference to the accompanying drawings. The embodiments of the present disclosure may be modified in various ways, and the scope of the present disclosure should not be construed as being limited to the embodiments described below. The embodiments are provided to more fully illustrate the present disclosure to those skilled in the art. Thus, the shapes of the components in the figures may be exaggerated to emphasize a clearer description. In addition, terms and words used in the specification and the claims should not be construed as being limited to ordinary or dictionary meanings, but interpreted based on the meanings and concepts corresponding to technical aspects of the present disclosure on the basis of the principle that the inventor is allowed to define terms appropriately for the best explanation.

Figure 1:
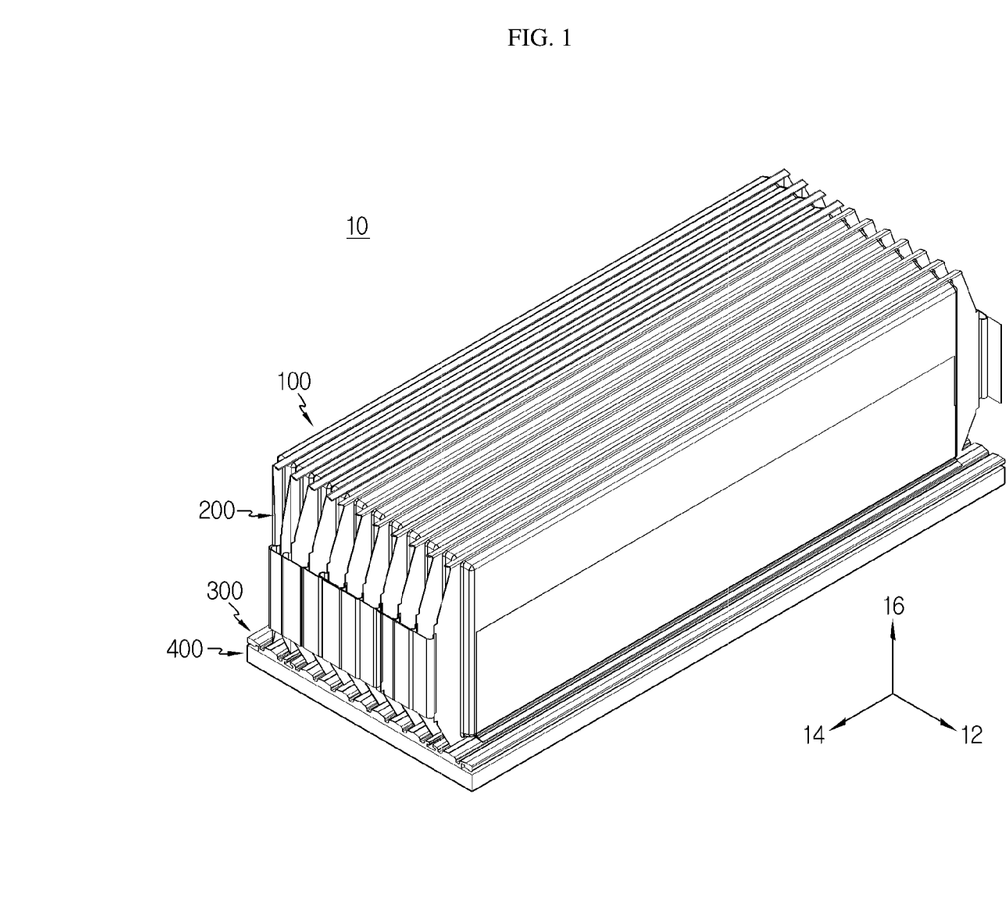
FIG. 1 is a perspective view showing a battery module according to an embodiment of the present disclosure.

FIG. 1 is a perspective view showing a battery module according to an embodiment of the present disclosure. Here, referring to FIG. 1, a battery module 10 has a plurality of battery cells 100. The battery cell 100 may be provided as a secondary battery. For example, the battery cell 100 may be provided as a pouch-type secondary battery. Hereinafter, the battery cell 100 of the present disclosure will be described as a pouch-type secondary battery as an example.

The battery module 10 includes a battery cell 100, a heat transfer tape 200, a cooling plate 300, and a heat sink 400.

A plurality of battery cells 100 may be provided. The plurality of battery cells 100 are arranged side by side so that their respective faces face each other. Hereinafter, a direction in which the plurality of battery cells 100 are arranged side by side is referred to as a first direction 12. When being observed from the above, a direction perpendicular to the first direction 12 is referred to as a second direction 14. A direction perpendicular to both the first direction 12 and the second direction 14 is referred to as a third direction 16.

Figure 2:
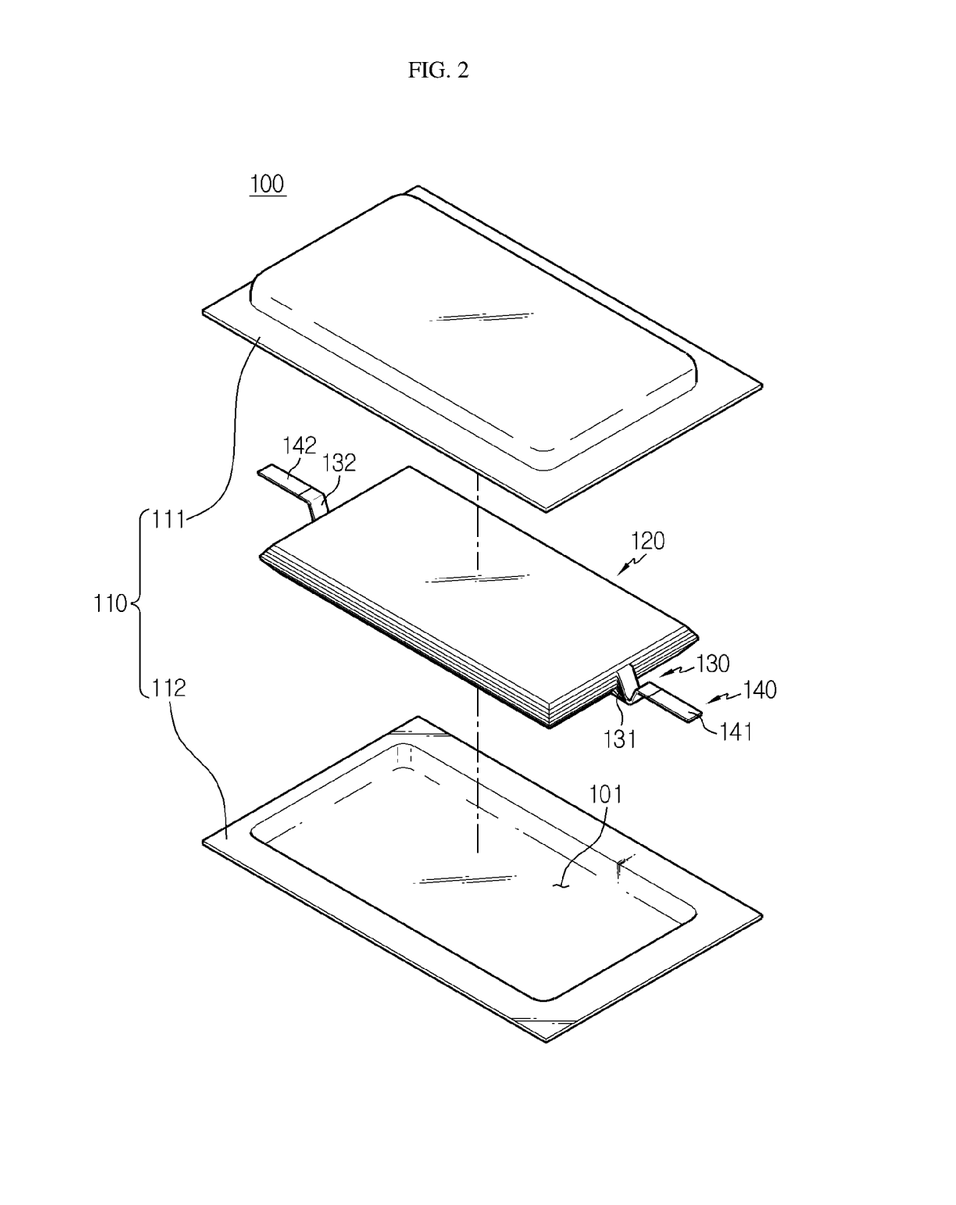
FIG. 2 is an exploded perspective view showing the battery cell of FIG. 1.
Figure 3:
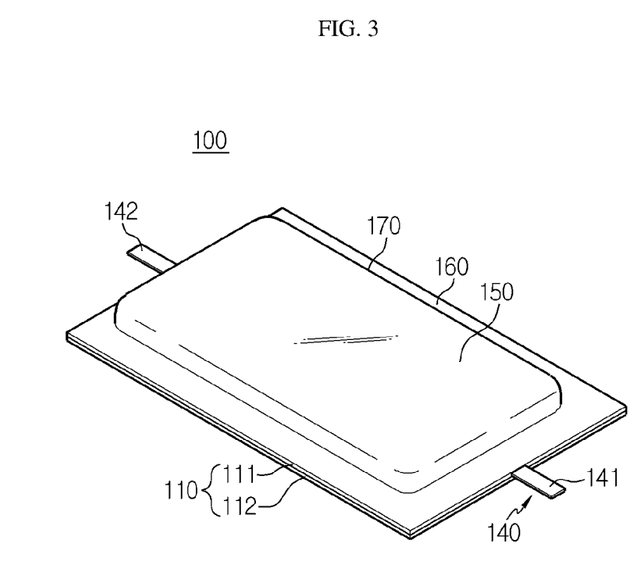
FIG. 3 is a perspective view showing the battery cell of FIG. 1 in an assembled state.

FIG. 2 is an exploded perspective view showing the battery cell of FIG. 1, and FIG. 3 is a perspective view showing the battery cell of FIG. 1 in an assembled state. Here, referring to FIGS. 2 and 3, the battery cell 100 includes a pouch case 110, an electrode assembly 120, an electrode tab 130 and an electrode lead 140.

The pouch case 110 has an inner space 101. Inside the pouch case 110, an electrode assembly 120 and an electrolyte, explained later, are positioned. A central region of the pouch case 110 is provided to protrude upward and downward. The pouch case 110 includes an upper case 111 and a lower case 112.

The upper case 111 and the lower case 112 are combined with each other to form the inner space 101. A central region of the upper case 111 has a concave shape protruding upward. The lower case 112 is located under the upper case 111. A central region of the lower case 112 has a concave shape protruding downward. Alternatively, the inner space 101 of the pouch case 110 may be formed in only any one of the upper case 111 and the lower case 112.

The upper case 111 and the lower case 112 respectively have a sealing portion 160. The sealing portion 160 of the upper case 111 and the sealing portion 160 of the lower case 112 may be provided to face each other. The sealing portion 160 of the upper case 111 and the sealing portion 160 of the lower case 112 may be bonded to each other by thermal bonding or the like. The inner space 101 may be sealed by bonding the sealing portions 160.

An electrolyte and an electrode assembly 120 are accommodated in the inner space 101 of the pouch case 110. The pouch case 110 may have an outer insulating layer, a metal layer, and an inner adhesive layer. The outer insulating layer may prevent exterior moisture, gas or the like from penetrating therein. The metal layer may improve the mechanical strength of the pouch case 110. The metal layer may be made of aluminum. Alternatively, the metal layer may be made of any one selected from an alloy of iron, carbon, chromium and manganese, an alloy of iron and nickel, aluminum or equivalents thereof. When the metal layer uses a material containing iron, mechanical strength may be enhanced. When the metal layer is made of aluminum, good ductility may be ensured. Aluminum is a desired material of the metal layer. The outer insulating layer and the inner adhesive layer may be made of a polymer material.

The electrode assembly 120 includes a positive electrode plate, a negative electrode plate, and a separator. The electrode assembly 120 may be configured so that at least one positive electrode plate and at least one negative electrode plate are disposed with a separator being interposed therebetween. The electrode assembly 120 may be configured so that a plurality of positive electrode plates and a plurality of negative electrode plates are alternately stacked. Alternatively, the electrode assembly 120 may also be configured so that one positive electrode plate and one negative electrode plate are wound.

The electrode plate of the electrode assembly 120 includes a current collector and active material slurry coated on one or both sides of the current collector. The active material slurry may be formed by stirring a solvent in a state where a granular active material, an auxiliary conductor, a binder, and a plasticizer are added thereto. Each electrode plate may have an uncoated portion corresponding to a region where the active material slurry is not coated. In the uncoated portion, an electrode tab 130 corresponding to each electrode plate may be formed.

The electrode tab 130 is extended to protrude from the electrode assembly 120. The electrode tab 130 includes a positive electrode tab 131 and a negative electrode tab 132. The positive electrode tab 131 may extend from the uncoated portion of the positive electrode plate, and the negative electrode tab 132 may extend from the uncoated portion of the negative electrode plate.

One positive electrode tab 131 and one negative electrode tab 132 may be provided in the battery cell 100, respectively. Alternatively, a plurality of positive electrode tabs 131 and a plurality of negative electrode tabs 132 may also be provided. For example, if one positive electrode plate and one negative electrode plate are included in the electrode assembly 120 of the battery cell 100, one positive electrode tab 131 and one negative electrode tab 132 may be included. Alternatively, a plurality of positive electrode tabs 131 and a plurality of negative electrode tabs 132 may be included, respectively. If a plurality of positive electrode plates and a plurality of negative electrode plates are included in the electrode assembly 120, a plurality of positive electrode tabs 131 and a plurality of negative electrode tabs 132 may be included, and one electrode tab 130 may be provided to one electrode plate.

The electrode lead 140 may electrically connect the battery cell 100 to other external devices. The electrode lead 140 may include a positive electrode lead 141 and a negative electrode lead 142. The electrode lead 140 may be provided to extend from the inside to the outside of the pouch case 110. A portion of the electrode lead 140 may be interposed between the sealing portions 160. The electrode lead 140 is connected to the electrode tab 130. The electrode lead 140 of the present disclosure may include the positive electrode lead 141 at one side of the pouch case 110 and include the negative electrode lead 142 at the other side of the pouch case 110. Alternatively, both the positive electrode lead 141 and the negative electrode lead 142 may be provided at one side of the pouch case 110.

The battery cell 100 has an accommodation portion 150, a sealing portion 160 and an edge portion 170. Here, the accommodation portion 150 is a portion where the electrode assembly 120 is accommodated in the battery cell 100. The sealing portion 160 is sealing portions at four sides of the pouch case 110 surrounding the accommodation portion 150. The edge portion 170 is defined as a part, or an edge, of the accommodation portion 150 which is adjacent to the sealing portion 160 and adjacent to the cooling plate 300, explained later.

Figure 4:
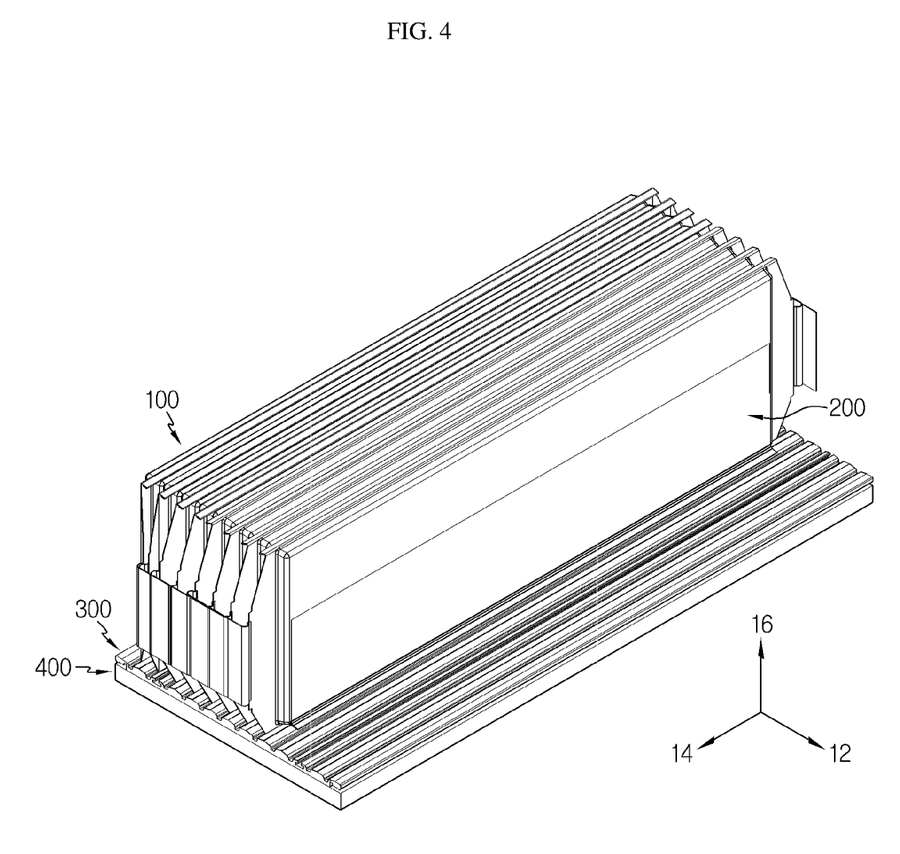
FIG. 4 is a perspective view showing a part of the battery module of FIG. 1.
Figure 5:
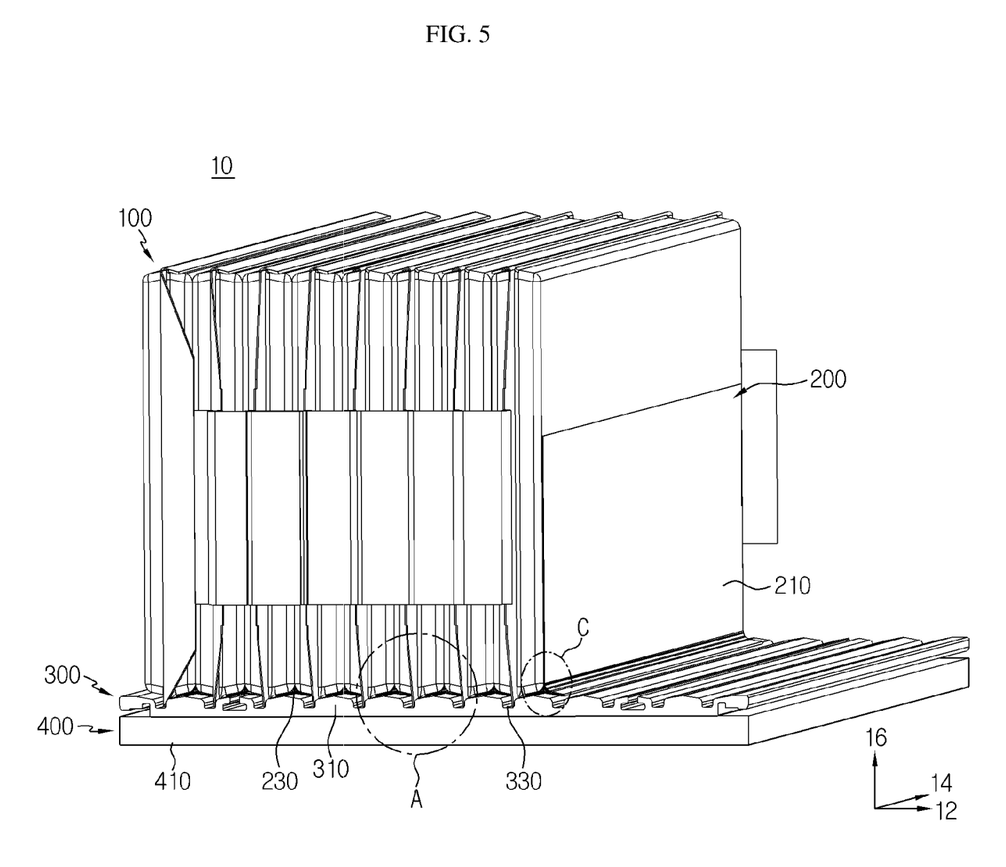
FIG. 5 is a perspective view showing a front portion of the battery module of FIG. 1.
Figure 6:
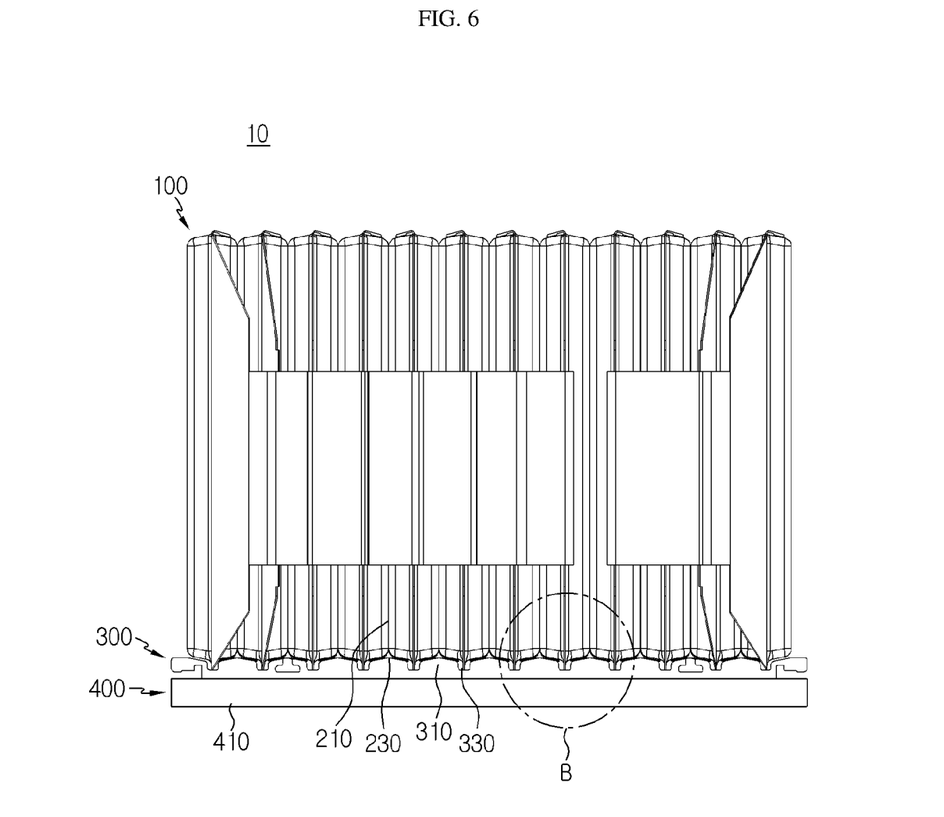
FIG. 6 is a front view showing the battery module of FIG. 1.

FIG. 4 is a perspective view showing a part of the battery module of FIG. 1, FIG. 5 is a perspective view showing a front portion of the battery module of FIG. 1, and FIG. 6 is a front view showing the battery module of FIG. 1. Here, referring to FIGS. 1 and 4 to 6, the heat transfer tape 200 is in contact with the battery cell 100 and transfers the heat of the battery cell 100 to the cooling plate 300, explained later. The heat transfer tape 200 may adhere the battery cells 100 to each other. The heat transfer tape 200 may adhere the cooling plate 300 and the battery cell 100. The heat transfer tape 200 may be provided in plural. The plurality of heat transfer tapes 200 may adhere a plurality of battery cells 100 to each other, or the battery cell 100 and the cooling plate 300 to each other.

The heat transfer tape 200 may be made of a material with good thermal conductivity. As an example, the heat transfer tape 200 may include a graphite sheet material. The heat transfer tape 200 may include a material with good adhesion.

The heat transfer tape 200 includes an adhesion portion 210 and a buffering portion 230.

The adhesion portion 210 may adhere adjacent battery cells 100. One side and the other side of the adhesion portion 210 may be in surface contact with different battery cells 100, respectively. The adhesion portion 210 is located between two adjacent battery cells 100. For example, the adhesion portion 210 and the battery cells 100 may be arranged in the order of the battery cell 100, the adhesion portion 210, the battery cell 100, the adhesion portion 210 and the battery cell 100 in the first direction 12. A surface of the adhesion portion 210 in contact with the battery cell 100 may be an adhesion surface. Both surfaces of the adhesion portion 210 may be the adhesion surface so that one adhesion surface is adhered to one battery cell 100. The adhesion portion 210 is provided to adhere two adjacent battery cells 100 so that the battery cells 100 may be stacked in the first direction 12. The battery cells 100 may be coupled easily by means of the adhesion portions 210 of the heat transfer tape 200 between the battery cells 100.

The area of the adhesion portion 210 in contact with the surface of the battery cell 100 may be smaller than the area of the battery cell 100. For example, the area of the adhesion portion 210 in contact with the surface of the battery cell 100 may be half the area of the battery cell 100. Alternatively, the area of the adhesion portion 210 may be provided in a size corresponding to the area of the battery cell 100. The area of the adhesion portion 210 in contact with the surface of the battery cell 100 may be selected differently depending on the manufacturing process of the battery module 10, the area of the battery cell 100, and the material characteristics of the battery cell 100.

Figure 7:
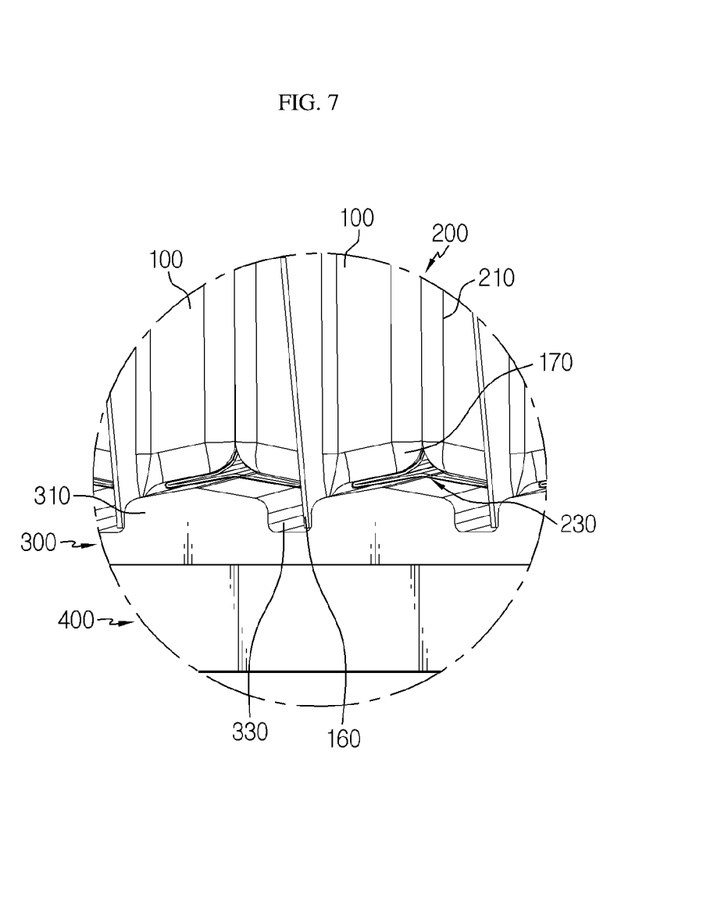
FIG. 7 is an enlarged perspective view showing a region A of FIG. 5.
Figure 8:
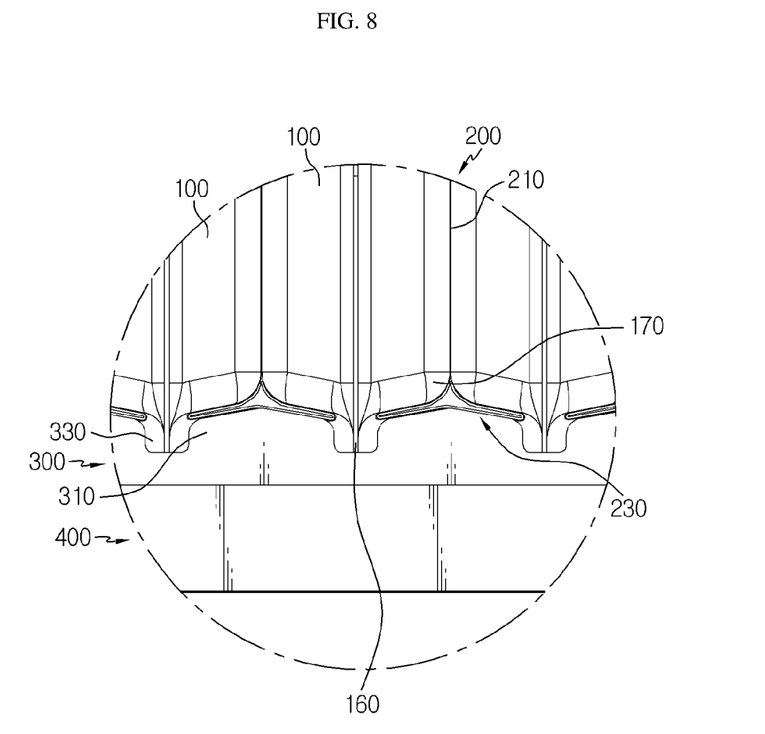
FIG. 8 is an enlarged view showing a region B of FIG. 6.
Figure 9:
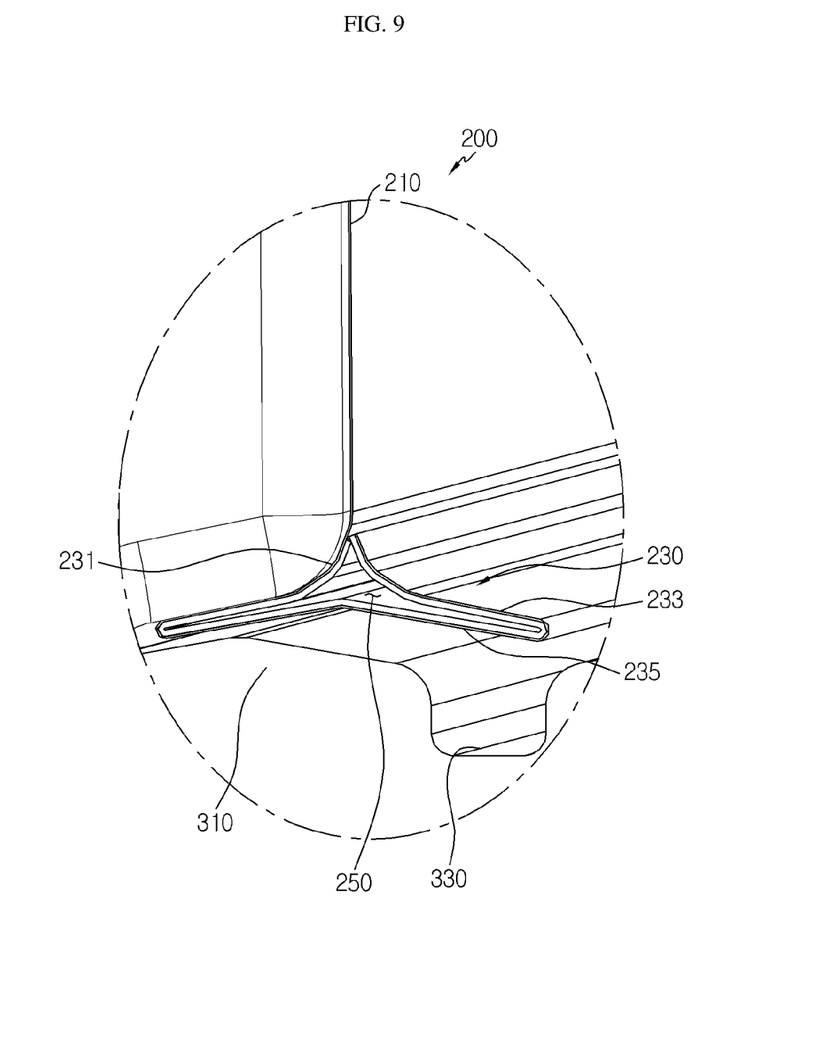
FIG. 9 is an enlarged view showing a region C of FIG. 5.

FIG. 7 is an enlarged perspective view showing a region A of FIG. 5, FIG. 8 is an enlarged view showing a region B of FIG. 6, and FIG. 9 is an enlarged view showing a region C of FIG. 5. Here, referring to FIGS. 7 to 9, the buffering portion 230 may be positioned below the adhesion portion 210 in the third direction 16. The buffering portion 230 may adhere the battery cell 100 to the cooling plate 300. The buffering portion 230 may be connected to the adhesion portion 210. The buffering portion 230 may be positioned between the edge portion 170 of the battery cell 100 and the cooling plate 300. The buffering portion 230 may have an adhesion surface on surfaces which are in contact with the edge portion 170 of the battery cell 100 and the cooling plate 300, respectively. The buffering portion 230 has a buffering space 250 therein. The buffering portion 230 includes a first inclined surface 231, a second inclined surface 233, and a horizontal surface 235.

The first inclined surface 231 is connected to the adhesion portion 210. One surface of the first inclined surface 231 is in surface contact with the edge portion 170 of the battery cell 100. The surface of the first inclined surface 231 in contact with the battery cell 100 may be provided as an adhesion surface.

The second inclined surface 233 is connected to the adhesion portion 210. The second inclined surface 233 may be connected to the first inclined surface 231. One surface of the second inclined surface 233 is in surface contact with the edge portion 170 of the battery cell 100. The battery cell 100 in contact with the first inclined surface 231 and the battery cell 100 in contact with the second inclined surface 233 may be different cells. The surface of the second inclined surface 233 in contact with the battery cell 100 may be provided as an adhesion surface.

The horizontal surface 235 is in contact with the cooling plate 300. The first inclined surface 231 and the second inclined surface 233 are located above the horizontal surface 235 in the third direction 16. The horizontal surface 235 may be coupled to the first inclined surface 231 and the second inclined surface 233. A central portion of the horizontal surface 235 may have a curved shape. The surface of the horizontal surface 235 in contact with the cooling plate 300 may be provided as an adhesion surface.

The first inclined surface 231, the second inclined surface 233, and the horizontal surface 235 are combined with each other to form a buffering space 250 therein. A section of the buffering space 250 may have an approximately hanger shape. Two battery cells 100 are located above the buffering space 250. When an external impact is transmitted to the buffering space 250, the buffering space 250 may prevent the battery cell 100 from colliding with the cooling plate 300 and thus prevent the edge portion 170 of the battery cell 100 from being damaged. In addition, the buffering space 250 may also prevent the battery cell 100 from partially swelling inside the battery cell 100 and thus contacting and damaging other parts.

The surface of the buffering portion 230, which faces the buffering space 250, may be provided as a non-adhesion surface. Alternatively, the surface of the buffering portion 230, which faces the buffering space 250, may be provided as a surface having an adhesive force. In this case, the surface of the buffering space 230, which faces the buffering space 250, may have a weaker adhesive force than the adhesive force of the adhesion surface of the adhesion portion 210. Alternatively, the surface of the buffering portion 230, which faces the buffering space 250, may have a weaker adhesive force than the adhesive force of the adhesion surface of the first inclined surface 231, the second inclined surface 233, or the horizontal surface 235. Since the surface of the buffering portion 230, which faces the buffering space 250, has a weaker adhesive force, it is possible to absorb external impacts.

The cooling plate 300 discharges the heat transferred from the battery cell 100 to the outside. The cooling plate 300 is located below the battery cell 100 in the third direction 16. The cooling plate 300 may be made of a material with good thermal conductivity. For example, the cooling plate 300 may be made of a metal material. For example, the cooling plate 300 may be made of aluminum. Alternatively, the cooling plate 300 may be made of other metal materials with good thermal conductivity.

The plurality of battery cells 100 are located at the top of the cooling plate 300. The cooling plate 300 is in contact with the plurality of battery cells 100. The cooling plate 300 has a protrusion 310 and an accommodation portion 330.

A plurality of protrusions 310 and accommodation portions 330 are provided. The protrusions 310 and the accommodation portions 330 are alternately located along the first direction 12.

The protrusions 310 may protrude in the third direction 16 perpendicular to the direction in which the plurality of the battery cells 100 are arranged. The protrusions 310 may be shaped to elongate in the second direction 14. The protrusions 310 may be shaped to incline upwards from both edges toward a center thereof. A cross section of the protrusions 310 may have a pentagonal shape. The adhesion portion 210 is located above the center of the protrusion 310 in the first direction 12. The horizontal surface 235 may be coupled to the upper surface of the protrusion 310. The protrusion 310, the horizontal surface 235, the first inclined surface 231 and the second inclined surface 233 may be positioned in order along the third direction 16.

The accommodation portion 330 is located between adjacent protrusions 310. A plurality of accommodation portions 330 may be provided. The plurality of accommodation portions 330 may be positioned along the first direction 12. The accommodation portion 330 may be shaped to be concave downwards in the third direction 16. The accommodation portion 330 may be shaped to elongate along the second direction 14. The seating portion 160 of the battery cell 100 may be located in the accommodation portion 330. Each of the plurality of accommodation portions 330 may accommodate the battery cell 100.

The heat sink 400 may exchange heat with the cooling plate 300. The heat sink 400 is located below the cooling plate 300 in the third direction 16.

The heat sink 400 has a chamber 410. The chamber 410 may have a cross-sectional area identical to or greater than that of the cooling plate 300. The chamber 410 may have a flow path (not shown) formed therein. A cooling fluid may flow through the flow path. As an example, the cooling fluid may be cooling water. Alternatively, the cooling fluid may be air. The chamber 410 may have an inlet pipe (not shown) through which the cooling fluid flows in and an outlet pipe (not shown) through which the cooling fluid flows out.

The battery pack according to the present disclosure may include at least one battery module 10 described above. In addition to the battery module 10, the battery pack may further include a case for accommodating the battery module 10, and various devices for controlling charge/discharge of the battery module 10. For example, a battery management system (BMS), a current sensor, a fuse, and the like may be further included.

The battery module 10 according to the present disclosure may be applied to vehicles such as electric vehicles and hybrid vehicles. The vehicle according to the present disclosure may include at least one battery pack including the battery module 10 according to the embodiment in the present disclosure.

Figure 10:
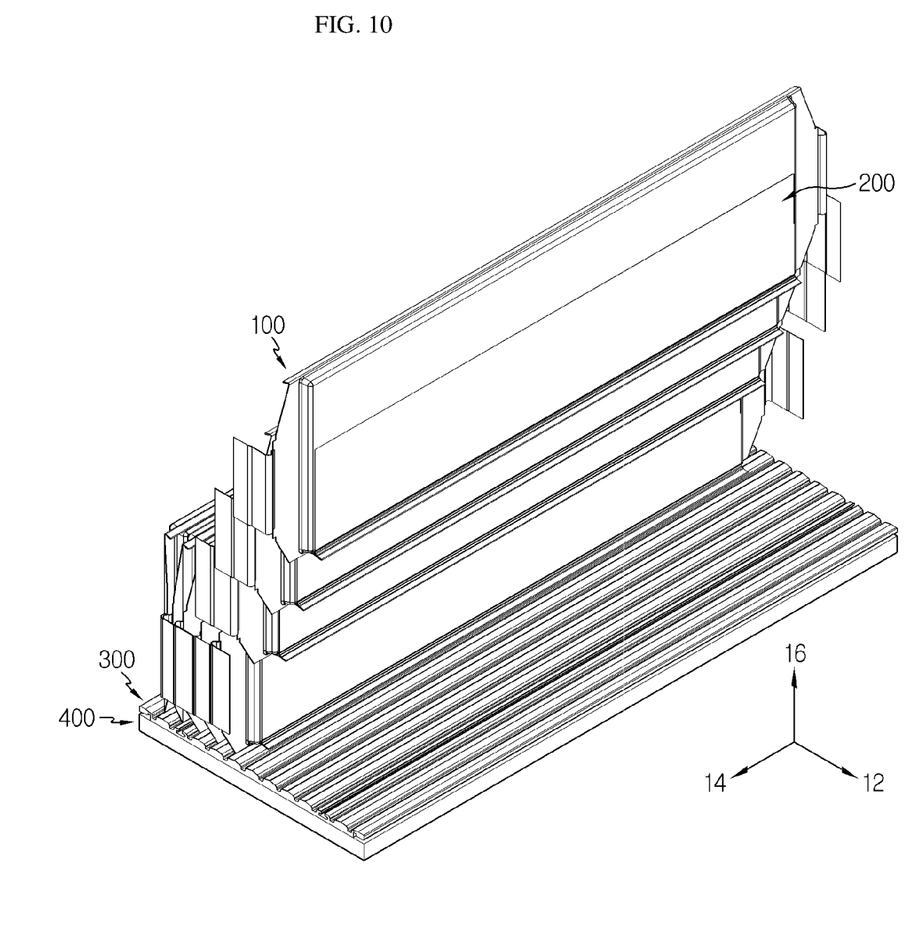
FIG. 10 is a perspective view schematically showing that the battery cells of FIG. 1 are coupled to a heat transfer tape.

Hereinafter, a manufacturing process of the battery module 10 according to the present disclosure will be described briefly. FIG. 10 is a perspective view schematically showing that the battery cells of FIG. 1 are coupled to a heat transfer tape.

Referring to FIG. 10, when the battery cells 100 are coupled to the cooling plate 300, the heat transfer tape 200 is attached to one surface of one battery cell 100 and coupled to the cooling plate 300. Then, another battery cell 100 is adhered to one surface of the battery cell 100 which is coupled to the cooling plate 300. At this time, the heat transfer tape 200 is not attached to the surface of the battery cell 100, attached later, which is adhered to the battery cell 100, attached former. The heat transfer tape 200 is attached in advance to the surface of the battery cell 100, attached later, which is opposite to the surface attached to the battery cell 100, attached former. When the battery module 100 is manufactured, the battery cells 100 and the cooling plate 300 may be easily coupled by repeating the above process by using the heat transfer tape 200 attached in advance. In other words, the manufacturing process of the battery module 10 may be simplified by providing the heat transfer tape 200. As described above, the battery cells 100 may be fixed to the surface of the heat transfer tape 200 by means of the adhesive property, which may simplify the manufacturing process and shorten the manufacturing process time.

Hereinafter, a cooling process of the battery cell 100 in the battery module 10 according the present disclosure will be described.

The heat generated from the battery cells 100 is directly transferred to the cooling plate 300, or transferred to the edge portion 170 of the battery cells 100, the heat transfer tape 200, and the cooling plate 300. When the heat generated from the battery cells 100 is directly transferred to the cooling plate 300, a portion of the battery cells 100, namely an outer end of the sealing portion 160, is in direct contact with the accommodation portion 330 of the cooling plate 300.

Different from the above, the heat may be transferred to the cooling plate 300 through the heat transfer tape 200. In this case, the heat is transferred to the cooling plate 300 through the adhesion portion 210 located between the battery cells 100, or the heat may be transferred to the cooling plate 300 through the buffering portion 230 which is in contact with the edge portion 170 of the battery cells 100. The heat transfer tape 200 is made of a material with high thermal conductivity as described above, and thus transfers the heat of the battery cells 100 to the cooling plate 300. The heat transferred to the cooling plate 300 exchanges heat with the heat sink 400.

The heat of the battery cells 100 may be cooled by transferring the heat of the battery cells 100 to the outside according to two paths as described above. In the present invention, the heat transfer tape 200 is made of a material with good thermal conductivity, and thus the heat of the battery cells 100 may be effectively transferred to the outside, thereby improving the cooling efficiency for the battery cells 100.

As described above, according to an embodiment of the present disclosure, the cooling efficiency for the battery cells 100 may be improved by means of the heat transfer tape 200. In addition, the battery cells 100 may be protected from external impacts by means of the buffering portion 230 of the heat transfer tape 200. Moreover, the manufacturing process of the battery module 10 may be simplified by means of the heat transfer tape 200, thereby improving the manufacturing process efficiency.

The above description is illustrative of the present disclosure. Also, the above disclosure is intended to illustrate and explain the preferred embodiments of the present disclosure, and the present disclosure may be used in various other combinations, modifications, and environments. In other words, the present disclosure may be changed or modified within the scope of the concept of the invention disclosed herein, within the equivalent scope of the disclosure, and/or within the skill and knowledge of the art. The described embodiments illustrate the best state of the art to implement the technical idea of the present disclosure, and various changes may be made thereto as being demanded for specific applications and uses of the present disclosure. Accordingly, the above description is not intended to limit the present disclosure to the embodiments. Also, the appended claims should be construed as encompassing such other embodiments.

What is claimed is:
1. A battery module, comprising:
   a plurality of battery cells arranged side by side to face each other in at least one direction;
   a cooling plate located below the plurality of battery cells; and
   a heat transfer tape adhered to the battery cells to transfer heat of the battery cells to the cooling plate,
   wherein the heat transfer tape includes:
      an adhesion portion between different battery cells and having one surface and another surface in surface contact with the respective different battery cells to adhere the battery cells together; and
      a buffering portion located between an edge portion of the battery cell and the cooling plate,
      wherein the buffering portion has a buffering space formed therein such that the heat transfer tape surrounds a perimeter of the buffering space,
      the perimeter of the buffering space defined by a first inclined surface, a horizontal surface, and a second inclined surface of the heat transfer tape.
2. The battery module according to claim 1,
   wherein the cooling plate is made of aluminum, and
   wherein the heat transfer tape is made of graphite.
3. The battery module according to claim 1, wherein the buffering portion further includes:

the first inclined surface in contact with an edge portion of any one battery cell among the battery cells;

the second inclined surface in contact with an edge portion of another battery cell adjacent to the any one battery cell, and having one end connected to the first inclined surface; and the horizontal surface in contact with the cooling plate, and having one end respectively connected to the first inclined surface and the second inclined surface, wherein the first inclined surface, the second inclined surface and the horizontal surface are combined to form the buffering space therein.

4. The battery module according to claim 3, wherein the cooling plate includes:

a plurality of protrusions on which the first inclined surface and the second inclined surface are located, the plurality of protrusions being in contact with the horizontal surface and protruding in a direction perpendicular to an arrangement direction of the plurality of battery cells; and a plurality of accommodation portions located respectively between the neighboring protrusions to accommodate the edge portion of the battery cell.

5. The battery module according to claim 4, wherein the protrusions are shaped to incline upwards from both edges to a center thereof, and the adhesion portion is provided above the protrusions.

6. The battery module according to claim 1, wherein the buffering portion has an adhesion surface on a surface which is in contact with the edge portion of the battery cell and the cooling plate.

7. The battery module according to claim 6, wherein a surface of the buffering portion, which faces the buffering space, is a non-adhesion surface.

8. The battery module according to claim 6, wherein a surface of the buffering portion, which faces the buffering space, has an adhesive force weaker than an adhesive force of the adhesion surface of the adhesion portion.

9. The battery module according to claim 1, further comprising:

a heat sink in which a cooling fluid flows, the heat sink exchanging heat with the cooling plate.

10. The battery module according to claim 1, wherein an area of the adhesion portion in contact with the surfaces of the battery cells is smaller than an area of the battery cells.

11. A battery pack, comprising a battery module defined in claim 1.

12. A vehicle, comprising a battery pack defined in claim 11.

13. The battery module according to claim 1, wherein the buffering space has a hanger shape.

14. The battery module according to claim 1, wherein the buffering portion includes the first inclined surface, the horizontal surface, and the second inclined surface, the first inclined surface extending between the adhesion portion and the horizontal surface, the horizontal surface extending between the first inclined surface and the second inclined surface, and the second inclined surface extending between the horizontal surface and the first inclined surface, to thereby surround the perimeter of the buffering space.

* * * * *